(12) United States Patent
Colena et al.

(10) Patent No.: US 8,209,276 B2
(45) Date of Patent: Jun. 26, 2012

(54) CONSTRAINT BASED SYSTEM WITH DYNAMIC CONSISTENCY CHECKING

(75) Inventors: Michael Colena, Lowell, MA (US); Joyce Ng, Sunnyvale, CA (US); Claire M. Bagley, Carlisle, MA (US)

(73) Assignee: Oracle International Corporation, Redwood Shores, CA (US)

( * ) Notice: Subject to any disclaimer, the term of this patent is extended or adjusted under 35 U.S.C. 154(b) by 912 days.

(21) Appl. No.: 12/258,593

(22) Filed: Oct. 27, 2008

(65) Prior Publication Data
US 2010/0106670 A1    Apr. 29, 2010

(51) Int. Cl.
*G06N 5/00* (2006.01)
(52) U.S. Cl. .......................... 706/46; 706/45
(58) Field of Classification Search .................. 706/46, 706/45
See application file for complete search history.

(56) References Cited

U.S. PATENT DOCUMENTS

| | | |
|---|---|---|
| 7,069,537 B2 | 6/2006 | Lazarov |
| 7,333,968 B2 | 2/2008 | Geller et al. |
| 2002/0107749 A1 | 8/2002 | Leslie et al. |
| 2002/0143653 A1 | 10/2002 | DiLena et al. |
| 2002/0166089 A1 | 11/2002 | Noy |
| 2004/0019852 A1 | 1/2004 | Purvis |
| 2005/0198621 A1 | 9/2005 | Tillmann et al. |
| 2005/0278271 A1 | 12/2005 | Anthony et al. |
| 2007/0094184 A1 | 4/2007 | Emek et al. |

OTHER PUBLICATIONS

Pesant, Counting solutions of CSPs: A Structural Approach, IJCAI-05, 2005, pp. 1-6.*
Mittal, Sanjay et al., "Dynamic Constraint Satisfaction Problems," Proceedings of the Eighth National Conference on Artificial Intelligence, 1996.
Stumptner, Markus et al., "Generative Constraint-Based Configuration of Large Technical Systems," Artificial Intelligence for Engineering Design, analysis and Manufacturing, pp. 307-320, No. 12, 1998, Cambridge University Press, USA.
Gelle, Esther et al., "Solving Methods for Conditional Constraint Satisfaction," IJCAL, 2003.
Frühwirth, Thom et al., "Principles of Contraint Systems and Constraint Solvers," Archives of Control Sciences: Special Issue on Constraint Programming, 16(2), http://www.informatik.uni-ulm.de/pm/mitarbeiter/fruehwirth/Papers/acs-systems3.pdf, 2006.
Lhomme, Olivier, "Consistency Techniques for Numeric CSPs," Proceedings in IJCAI-93, pp. 232-238, 1993, Chambery, France.
Selectica, "Selectica Configuration," Solution Overview, 2005, Selectica, Inc., San Jose, CA.
ILOG, "ILOG Configurator, Powering online product and service configuration applications," Product Datasheet, Mar. 2005, ILOG.S.A.
Oracle, "Oracle Configurator," Oracle Data Sheet, 2008, Oracle.

(Continued)

*Primary Examiner* — Wilbert L Starks
(74) *Attorney, Agent, or Firm* — Squire Sanders (US) LLP

(57) ABSTRACT

A constraint based system solves a network that includes a first variable node having a first integer domain, a second variable node having a second integer domain, and a constraint for the first variable node and the second variable node. The system retrieves a first integer domain representation of the first integer domain and a second integer domain representation of the second integer domain and determines from the first and second integer domain representations if the first integer domain or second integer domain has at least one excluded value. The system then determines a type of constraint consistency checking based on whether the integer domains have at least one excluded value.

18 Claims, 5 Drawing Sheets

OTHER PUBLICATIONS

Tacton, "Tacton's Sales Configurator—Bridging the gap between engineering and sales for selling customized products," http://www.tacton.com/templates/page_68.aspx?epslanguage=EN, 2007, Tacton Systems AB, Sweden.

Benhamou, Frédérick et al., "Applying Interval Arithmetic to Real, Integer and Boolean Constraints," Journal of Logic Programming, 32(1), 1997.

Sabin, Daniel et al., "Configuration as Composite Constraint Satisfaction," Proceedings of the ($1^{st}$) Artificial Intelligence and Manufacturing Research Planning Workshop, 1996.

Fleischanderl, Gerhard et al., "Configuring Large Systems Using Generative Constraint Satisfaction," IEEE, pp. 59-68, No. 1094-7167/98, Jul./Aug. 2008, IEEE.

* cited by examiner

CONSTRAINT BASED SYSTEM WITH DYNAMIC CONSISTENCY CHECKING

FIELD OF THE INVENTION

One embodiment is directed generally to a computer system, and in particular to a constraint based computer system that solves constraint satisfaction problems.

BACKGROUND INFORMATION

Many of the tasks that are addressed by decision-making systems and artificial intelligence systems can be represented as constraint satisfaction problems ("CSP"s). In this representation, the task is specified in terms of a set of variables, each of which can assume values in a given domain, and a set of constraints that the variables must simultaneously satisfy. The set of variables, domains and constraints is referred to as a CSP. Each constraint may be expressed as a relation, defined over some subset of the variables, denoting valid combinations of their values. A solution to a CSP is an assignment of a value to all the variables from their respective domains that satisfies all of the constraints.

A constraint based system includes a constraint solver that attempts to find one or more solutions to a given CSP, or prove that no solution exists. Constraint based systems are used for many artificial intelligence related applications and a variety of other applications, including: (1) Product configurators; (2) Robotic control; (3) Temporal reasoning; (4) Natural language processing; (5) Spatial reasoning; (6) Test-case generation for software and hardware systems; (7) Machine vision; (8) Medical diagnosis; (9) Resource allocation; and (10) Frequency allocation.

The network of constraints in a CSP can be viewed as a graph, having a node for each variable and an edge or "arc" for each constraint. The members of each arc are the variables that appear in the constraint to which the arc corresponds. An arc is said to be consistent if for any variable of the arc, and any value in the domain of the variable, there is a valid assignment of values to the other variables on the arc that satisfies the constraint represented by the arc.

One of the techniques used by constraint based systems to propagate value changes and detect constraint violations over a constraint is consistency checking. Many different consistency checking approaches have been developed, each best suited for different categories of problems, yet no single approach is optimal for all states of a constraint problem.

SUMMARY OF THE INVENTION

One embodiment is a constraint based system that solves a network that includes a first variable node having a first integer domain, a second variable node having a second integer domain, and a constraint for the first variable node and the second variable node. The system retrieves a first integer domain representation of the first integer domain and a second integer domain representation of the second integer domain and determines from the first and second integer domain representations if the first integer domain or second integer domain has at least one excluded value. The system then determines a type of constraint consistency checking based on whether the integer domains have at least one excluded value.

DETAILED DESCRIPTION

One embodiment is a constraint based system that dynamically determines a type of consistency checking to be used based on the current state of variable domains of the constraint network. Therefore, the most efficient and effective type of consistency checking can be selected.

Figure 1:
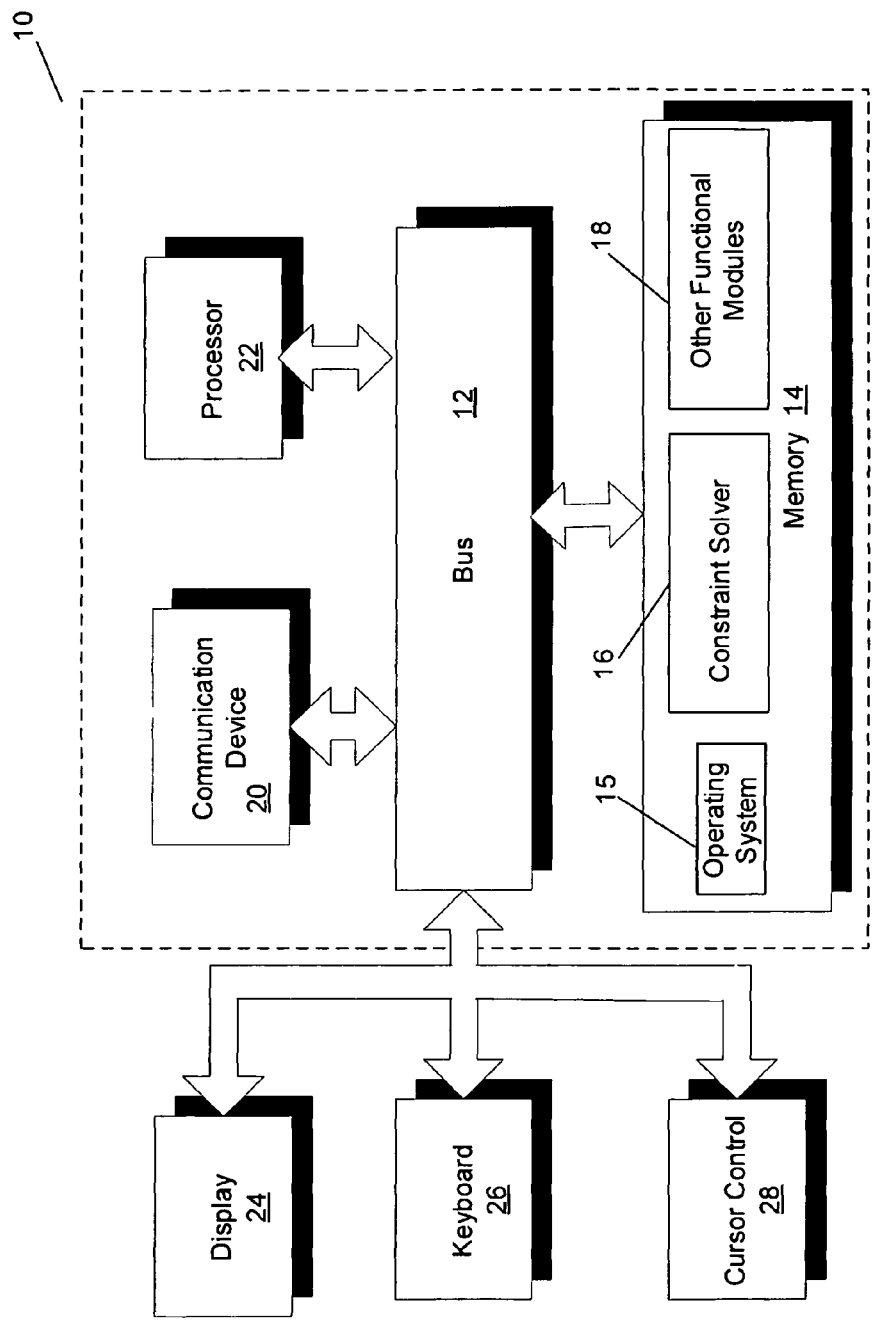
FIG. 1 is a block diagram of a constraint based system that can implement an embodiment of the present invention.

FIG. 1 is a block diagram of a constraint based system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a constraint solver module 16 that performs constraint solving with dynamic consistency checking as disclosed in more detail below. System 10 can be part of a larger system that includes a constraint solver such as a product configurator or artificial intelligence system. Therefore, system 10 will typically include one or more additional functional modules 18 to include the additional functionality.

In one embodiment, constraint solver 16 models problems as a network of a set of variables that each have a domain of possible values, and constraints that limit the value that the variables may take. Constraint solver 16 then solves the constraint problem. Table 1 below provides examples of variables and domains, and Table 2 below provides examples of constraints.

TABLE 1

| Variable Name | Type | Domain |
| --- | --- | --- |
| A | Integer (enumerated) | {1, 2, 4, 5, 6} |
| B | Integer (interval) | [1 ... 5] |
| Weight | Float | [1.25 ... 10.50] |
| Choice | Boolean | {false, true} |
| Color | Set | {Black, Red, Silver, Blue} |

TABLE 2

A = B
Weight = Sum (contents.weight)
Choice Requires (Not (Color contains Black))

One known method of finding a solution to a constraint problem is through the use of a backtracking search algorithm. A backtracking search traverses the solution space of a problem making value assignments to variables. When a conflict or invalid solution is detected, the algorithm backtracks by reverting the previous choice and trying an alternative. This continues until all variables have been assigned and a solution is found, or all alternate choices have been exhausted so that there is no viable solution.

The search for a solution can be made more efficient by attempting to reduce the amount of dead-end backtracking that occurs. One such method is to evaluate the constraints after each choice of a variable to ensure their consistency and to propagate their effects to the related variables. There are many known approaches for constraint consistency checking, each with varying strengths of inference. Examples of constraint consistency checking includes arc consistency, bounds consistency, path consistency, arc B-consistency, 3-B-consistency, etc. A consistency checking type with greater inference power will reduce the amount of dead-end backtracking performed by the search algorithm, but it generally comes at the cost of greater computational time and space. The efficiency of the search for a solution is a trade-off between the expense of inference and that of backtracking from dead-ends.

As a way to compare two types of consistency checking, consider arc consistency and bounds consistency. Arc consistency ensures that every value in the domain of a variable has a supporting value in the other variable that satisfies the constraint. Values that are not consistent are removed from the domain. The inference power of arc consistency ensures that every value of a variable is consistent with its constrained neighbors, but comes at the complexity and expense of representing and reasoning over all pairs of values. This becomes very expensive for integer domains substantially larger than two (e.g., domains representing hours in the day, days of the year, employees in a corporation, etc.).

In contrast, for large integer domains, bounds consistency is more economical than arc consistency because it reasons only over the lower and upper bounds of an ordered variable domain. A constraint is bounds consistent if, for each of its variables, there exists a value in the other variables that is compatible with its lower and upper bound values. The benefit of bounds consistency is that for any pair of variables, regardless of domain size, a constraint only needs to reason over two pairs of values, the domain minimum and maximum end points. But reasoning over only the end-points means weaker power of inference in some cases, and the potential to discover conflicts further into the propagation and search processes.

Figure 2:
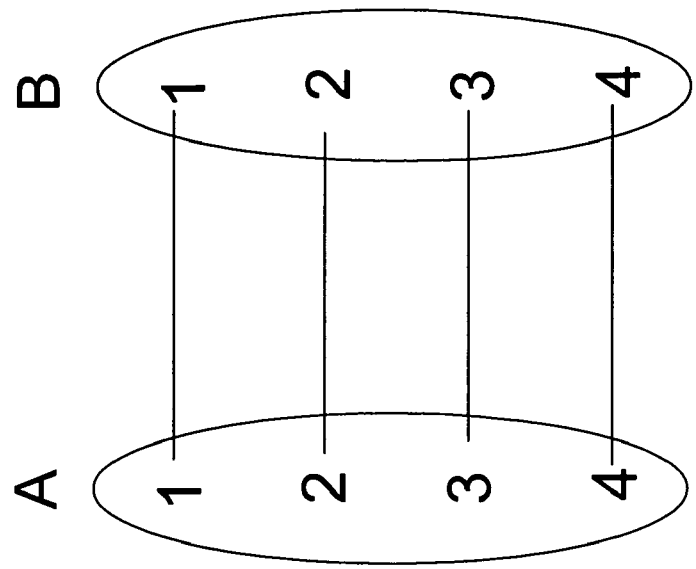
FIG. 2 is an example of two variable nodes having integer domains and a constraint, and consistency arcs between the nodes in order to compare arc consistency with bounds consistency.
Figure 2:
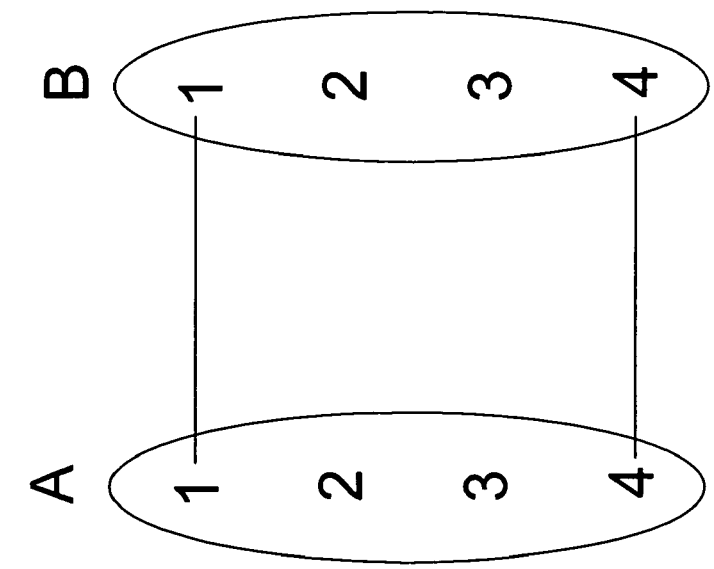

FIG. 2 is an example of two variable nodes having integer domains and a constraint, and consistency arcs between the nodes in order to compare arc consistency with bounds consistency. Both node A and node B include domain values 1-4 and the constraint is A=B. For bounds consistency (left), consistency arcs are only needed for 1 and 4 (i.e., the endpoints of 1-4). In contrast, for arc consistency (right), consistency arcs are needed for every integer 1-4. In the example of FIG. 2, both consistency methods have equal power, but bounds consistency is preferred because it is more efficient.

Figure 3:
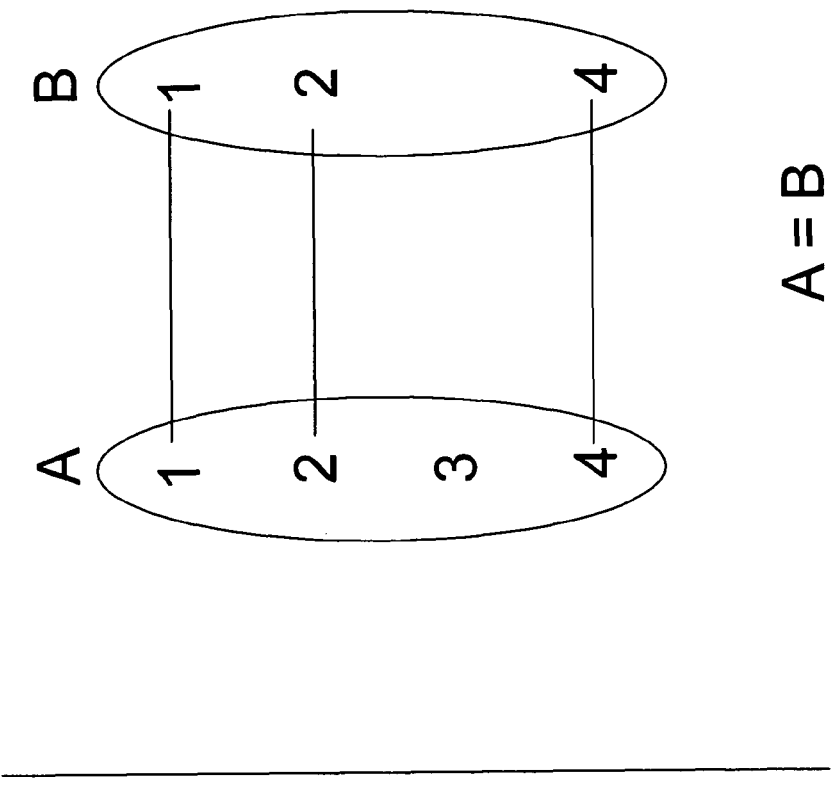
FIG. 3 is another example of two nodes and consistency arcs between the nodes in order to compare arc consistency with bounds consistency.
Figure 3:
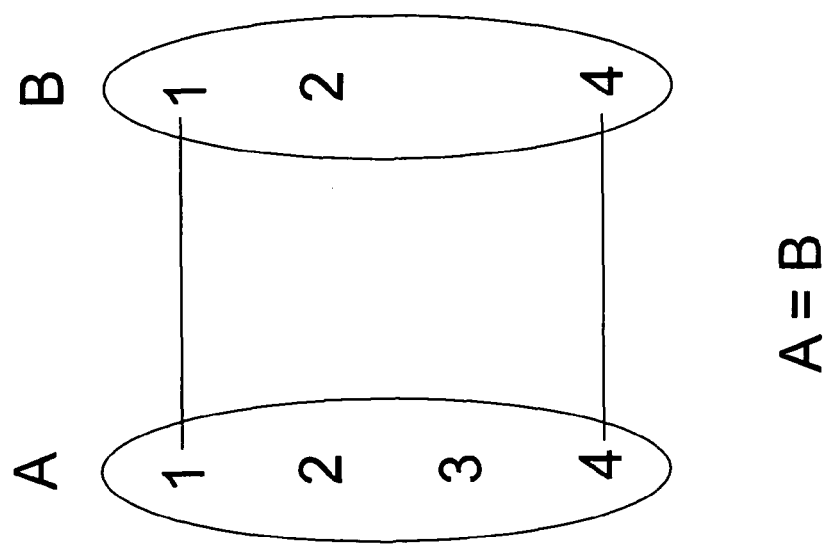

FIG. 3 is another example of two nodes and consistency arcs between the nodes in order to compare arc consistency with bounds consistency. In contrast with node B of FIG. 2, node B of FIG. 3 includes the values 1, 2 and 4 (i.e., 3 is omitted). For bounds consistency (left), consistency arcs are only needed for 1 and 4 (i.e., the endpoints of B). However, the integer value 3 would not be removed because it is not an endpoint. In contrast, for arc consistency, consistency arcs are needed for 1, 2 and 4, and 3 would be removed from node A because it does not have a corresponding 3 in node B. Therefore, in the example of FIG. 3, arc consistency is preferred due to higher inference power because 3 would be removed from node A at an earlier stage than with bounds consistency and will no longer be available for further interactions.

One embodiment chooses a method of consistency checking based on a tradeoff between inference power and system performance. One embodiment dynamically modifies its consistency checking approach in response to the problem state. In one embodiment, constraints recognize conditions in their participating variables where simplified forms of constraint checking (e.g., bounds consistency) can be equivalent in outcome to stronger forms (e.g., arc consistency).

Figure 4:
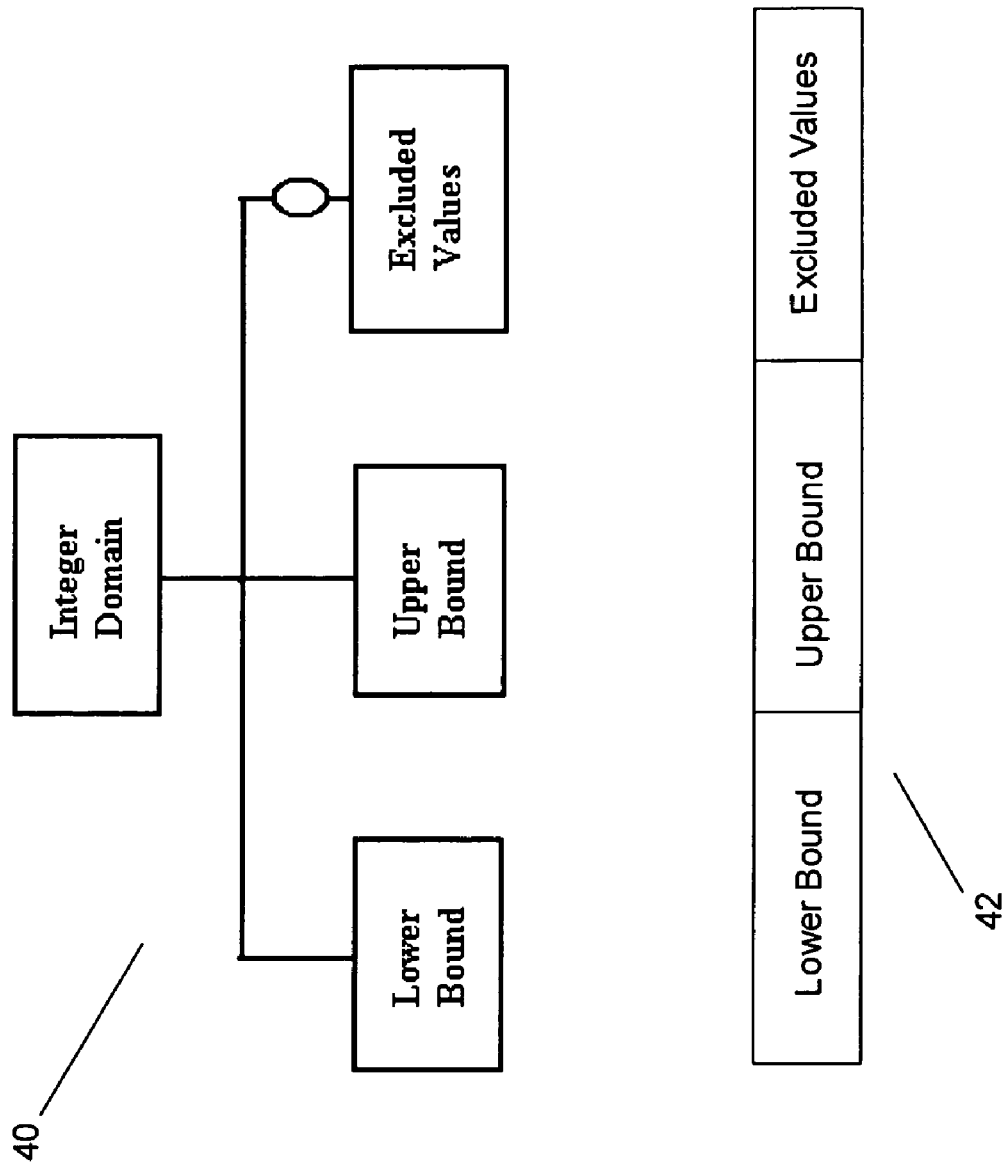
FIG. 4 illustrates a structure of an integer domain representation in accordance with one embodiment.

In one embodiment, an integer domain representation is generated that can dynamically change internal representation to support strong or simplified consistency checking, based upon the presence of domain exclusions. FIG. 4 illustrates the structure 40 of the integer domain representation in accordance with one embodiment. The integer domain representation includes the lower bound integer, the upper bound integer and optional excluded values. In one embodiment, the integer domain representation can be any type of data structure such as data structure 42. In one embodiment, the excluded values of data structure 42 can be a bit set such as a sparse bit set.

Figure 5:
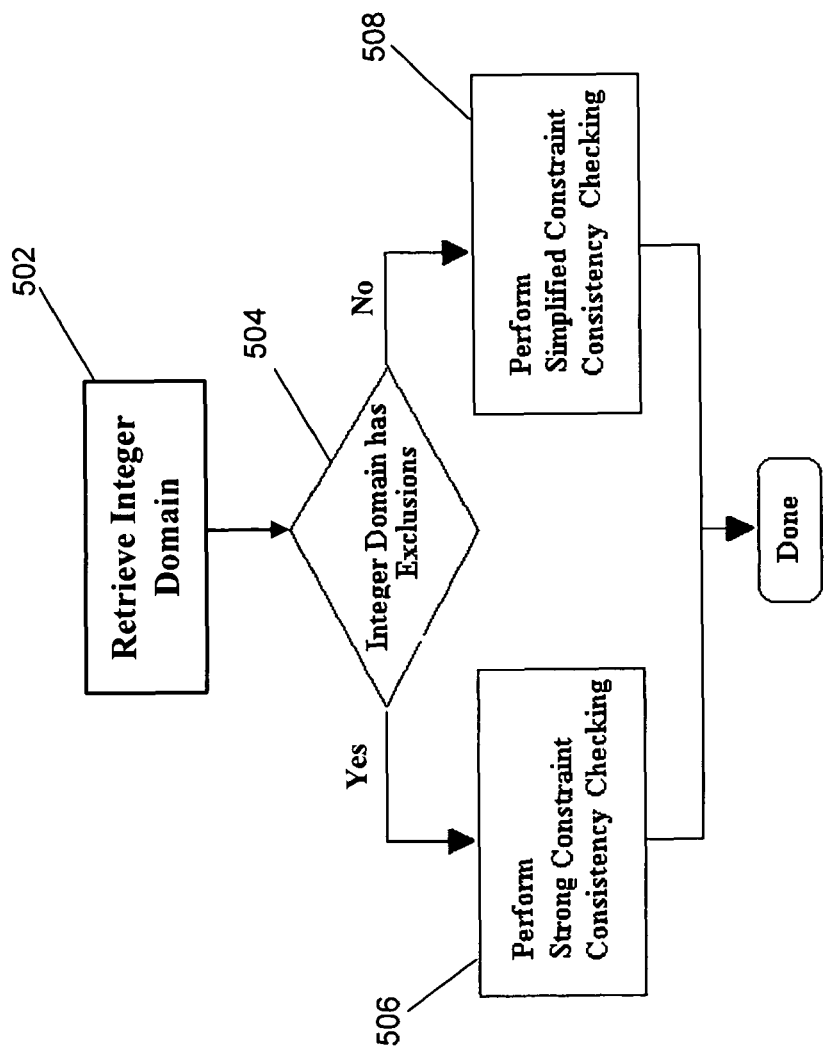
FIG. 5 is a flow diagram of the functionality of a constraint solver when implementing constraint consistency evaluation between two variable nodes coupled by a constraint after a choice of a variable has been made accordance with one embodiment.

One embodiment evaluates constraint consistency so that the consistency checking strength is tailored on a per-constraint basis. FIG. 5 is a flow diagram of the functionality of constraint solver 16 when implementing constraint consistency evaluation between two variable nodes coupled by a constraint after a choice of a variable has been made in accordance with one embodiment. In one embodiment, the functionality of FIG. 5 allows for individual constraints to determine the consistency strength required and to dynamically change their evaluation approach. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502, the integer domain for each of the variables is retrieved. In one embodiment the integer domain is in the form of a compact representation such as data structure 42 of FIG. 4, and includes the lower bound integer, the upper bound integer and optional excluded values of the integer domain.

At 504, it is determined if either of the integer domains has exclusions. If they have exclusions, the integer domains will include excluded values.

If either of the integer domains includes excluded values, at 506 a strong (or "first type") of consistency checking is performed. A consistency checking is considered "strong" if it has a high or maximum strength of inference. In one embodiment, the first type of consistency checking is arc consistency.

If either of the integer domains does not include excluded values, at 508 a simplified/weaker (or "second type") of consistency checking is performed. A consistency checking is considered "simplified" in one embodiment if it does not reason over the entire integer domain or if it has minimal expense. In one embodiment, the second type of consistency checking is bounds consistency.

As disclosed, an embodiment is a constraint solver that dynamically determine the optimal consistency checking approach on a per constraint and per domain state basis. An embodiment is able to dynamically adjust between maximum inference power and minimal expense. Therefore, optimal propagation power is used, and unnecessary and costly search backtracking is limited.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer implemented method of constraint solving for a network comprising a first variable node having a first integer domain, a second variable node having a second integer domain, and a constraint for the first variable node and the second variable node, the method comprising:
   retrieving a first integer domain representation of the first integer domain and a second integer domain representation of the second integer domain;
   determining at a processor from the first and second integer domain representations if the first integer domain or second integer domain has at least one excluded value;
   performing at the processor a first type of constraint consistency checking if it is determined that there is at least one excluded value; and
   performing at the processor a second type of constraint consistency checking if it is determined that there is not at least one excluded value.

2. The method of claim 1, wherein the first and second integer domain representations comprise a lower bound of the integer domains, an upper bound of the integer domains, and any excluded values of the integer domains.

3. The method of claim 1, wherein the first type of constraint consistency checking is a strong consistency checking that reasons over all integers of the integer domains.

4. The method of claim 1, wherein the first type of constraint consistency checking is an arc consistency.

5. The method of claim 1, wherein the second type of constraint consistency checking is a simplified constraint consistency checking that does not reason over all integers of the integer domains.

6. The method of claim 1, wherein the second type of constraint consistency checking is a bounds consistency.

7. The method of claim 1, further comprising receiving a choice of a variable for the network.

8. The method of claim 1, wherein the network comprises a product configurator.

9. A computer readable medium having instructions stored thereon that, when executed by a processor, causes the processor to function as a constraint solver for a network comprising a first variable node having a first integer domain, a second variable node having a second integer domain, and a constraint for the first variable node and the second variable node, the processor function comprising:
   retrieving a first integer domain representation of the first integer domain and a second integer domain representation of the second integer domain;
   determining from the first and second integer domain representations if the first integer domain or second integer domain has at least one excluded value;
   performing a first type of constraint consistency checking if it is determined that there is at least one excluded value; and
   performing a second type of constraint consistency checking if it is determined that there is not at least one excluded value.

10. The computer readable medium of claim 9, wherein the first and second integer domain representations comprise a lower bound of the integer domains, an upper bound of the integer domains, and any excluded values of the integer domains.

11. The computer readable medium claim 9, wherein the first type of constraint consistency checking is an arc consistency.

12. The computer readable medium of claim 9, wherein the second type of constraint consistency checking is a bounds consistency.

13. The computer readable medium of claim 9, wherein the network comprises a product configurator.

14. A computer implemented method of constraint solving for a constraint network comprising a plurality of variable nodes, each coupled to a constraint, the method comprising:
   receiving at a processor a choice for a first variable node having an integer domain;
   evaluating at the processor a first constraint coupled to the first variable node and a second variable node, wherein the evaluating comprises determining if the integer domain has at least one excluded value and performing a first type of consistency checking if it is determined that the integer domain has at least one excluded value, and performing a second type of consistency checking if it is determined that the integer domain does not have at least one excluded value.

15. The method of claim 14, wherein the first type of consistency checking is an arc consistency.

16. The method of claim 14, wherein the second type of consistency checking is a bounds consistency.

17. The method of claim 14, wherein the network comprises a product configurator.

18. A constraint based system for a network comprising a first variable node having a first integer domain, a second variable node having a second integer domain, and a constraint for the first variable node and the second variable node, the system comprising:
   retrieving a first integer domain representation of the first integer domain and a second integer domain representation of the second integer domain;
   means for determining from the first and second integer domain representations if the first integer domain or second integer domain has at least one excluded value;
   means for performing a first type of constraint consistency checking if it is determined that there is at least one excluded value; and
   means for performing a second type of consistency checking if it is determined that the integer domain does not have at least one excluded value.

* * * * *

UNITED STATES PATENT AND TRADEMARK OFFICE
CERTIFICATE OF CORRECTION

PATENT NO. : 8,209,276 B2
APPLICATION NO. : 12/258593
DATED : June 26, 2012
INVENTOR(S) : Colena et al.

It is certified that error appears in the above-identified patent and that said Letters Patent is hereby corrected as shown below:

On the Title Page, Item (56), under "Other Publications", line 11, delete "IJCAL," and insert -- IJCAI, --, therefor.

On the Title Page, in column 2, Item (56), under "Other Publications", line 12, delete "Contraint" and insert -- Constraint --, therefor.

In column 6, line 20, in Claim 11, delete "Medium" and insert -- medium of --, therefor.

Signed and Sealed this
Sixteenth Day of October, 2012

David J. Kappos
*Director of the United States Patent and Trademark Office*